(12) United States Patent
Ohrstrom et al.

(10) Patent No.: US 8,533,383 B2
(45) Date of Patent: Sep. 10, 2013

(54) SYSTEM AND METHOD FOR LOCKING MEMORY AREAS IN A JVM TO FACILITATE SHARING BETWEEN VIRTUAL SERVERS

(75) Inventors: Fredrik Ohrstrom, Stockholm (SE); Mikael Vidstedt, Solna (SE)

(73) Assignee: Oracle International Corporation, Redwood Shores, CA (US)

( * ) Notice: Subject to any disclaimer, the term of this patent is extended or adjusted under 35 U.S.C. 154(b) by 382 days.

(21) Appl. No.: 13/007,429

(22) Filed: Jan. 14, 2011

(65) Prior Publication Data
US 2012/0185847 A1   Jul. 19, 2012

(51) Int. Cl.
*G06F 12/00* (2006.01)
(52) U.S. Cl.
USPC ............. 711/6; 711/152; 711/170; 711/173
(58) Field of Classification Search
None
See application file for complete search history.

(56) References Cited

U.S. PATENT DOCUMENTS

2010/0175070 A1 *   7/2010   Baba ........................... 718/105

* cited by examiner

*Primary Examiner* — Shawn X Gu
(74) *Attorney, Agent, or Firm* — Fliesler Meyer LLP

(57) ABSTRACT

A system and method for locking memory areas in a Java Virtual Machines (JVM) to facilitate sharing between virtual servers. In accordance with an embodiment, the system comprises a computing/virtual execution environment, which includes one or more physical computers, computer systems, server computers, or similar computing devices, a hypervisor, and a virtual machine or JVM. The JVM allows one or more application images to be run on the computer, wherein the application images can include application server instances. The application server uses a first large page in memory during its startup process, and is configured so that it signals to the JVM when the application server has completed its startup and has potentially pre-optimized important code. When the JVM receives this signal, it internally write-protects or locks the page used for application server code memory, so that any new JITed code or re-optimized code is subsequently written into a new large page. The original page will therefore be undisturbed and will always be shareable between the virtual servers running within the hypervisor.

18 Claims, 3 Drawing Sheets

SYSTEM AND METHOD FOR LOCKING MEMORY AREAS IN A JVM TO FACILITATE SHARING BETWEEN VIRTUAL SERVERS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to virtual machines, such as Java Virtual Machines (JVM), and is particularly related to a system and method for locking memory areas in a JVM to facilitate sharing between virtual servers.

BACKGROUND

A virtual machine (VM) can be considered an abstract computer that allows for portability of software applications between different underlying computer architectures, including different computer hardware platforms and/or operating systems. The VM provides a uniform layer of abstraction between the hardware platform and any compiled software applications that runs thereon. Virtual machines are considered essential for the portability of certain technologies, such as Java. The Java Virtual Machine (JVM) allows compiled Java programs to be run on the JVM, independently of whatever hardware or operating system may be used underneath. Examples of available JVMs include the Oracle JRockit and Hotspot JVMs.

Recently, there is a desire to deploy virtual machines on high performance computer hardware systems, such as multi-processor rack-based servers, to support highly efficient application server and similar technologies. Examples of application servers which can provide such technologies are the Oracle WebLogic Server. In some instances, a hypervisor acts as an additional layer between the server's hardware and its operating system. This provides an additional abstraction layer that allows each physical server to run one or more virtual servers, and effectively decouples the operating system and its applications from the underlying physical server. This is of particular use in a cloud-based environment.

Unfortunately there often arises a conflict between the hypervisor memory sharing, and that of the Java Virtual Machine. For example, in those environments in which a virtual machine image is used to boot virtual servers, initially a lot of memory can be shared between the different virtual servers, before the application server has loaded. Then, as soon as the application server starts executing with a real load, the JVM will compile new code, and potentially re-optimize old code. This changing, and forced un-sharing is significantly worse when the JVM tries to use large-pages to optimize performance. These are the general areas that embodiments of the present invention are intended to address.

SUMMARY

Disclosed herein is a system and method for locking memory areas in a Java Virtual Machines (JVM) to facilitate sharing between virtual servers. In accordance with an embodiment, the system comprises a computing/virtual execution environment, which includes one or more physical computers, computer systems, server computers, or similar computing devices, a hypervisor, and a virtual machine or JVM. The JVM allows one or more application images to be run on the computer, wherein the application images can include application server instances. The application server uses a first large page in memory during its startup process, and is configured so that it signals to the JVM when the application server has completed its startup and has potentially pre-optimized important code. When the JVM receives this signal, it internally write-protects or locks the page used for application server code memory, so that any new JITed code or re-optimized code is subsequently written into a new large page. The original page will therefore be undisturbed and will always be shareable between the virtual servers running within the hypervisor.

DETAILED DESCRIPTION

Figure 1:
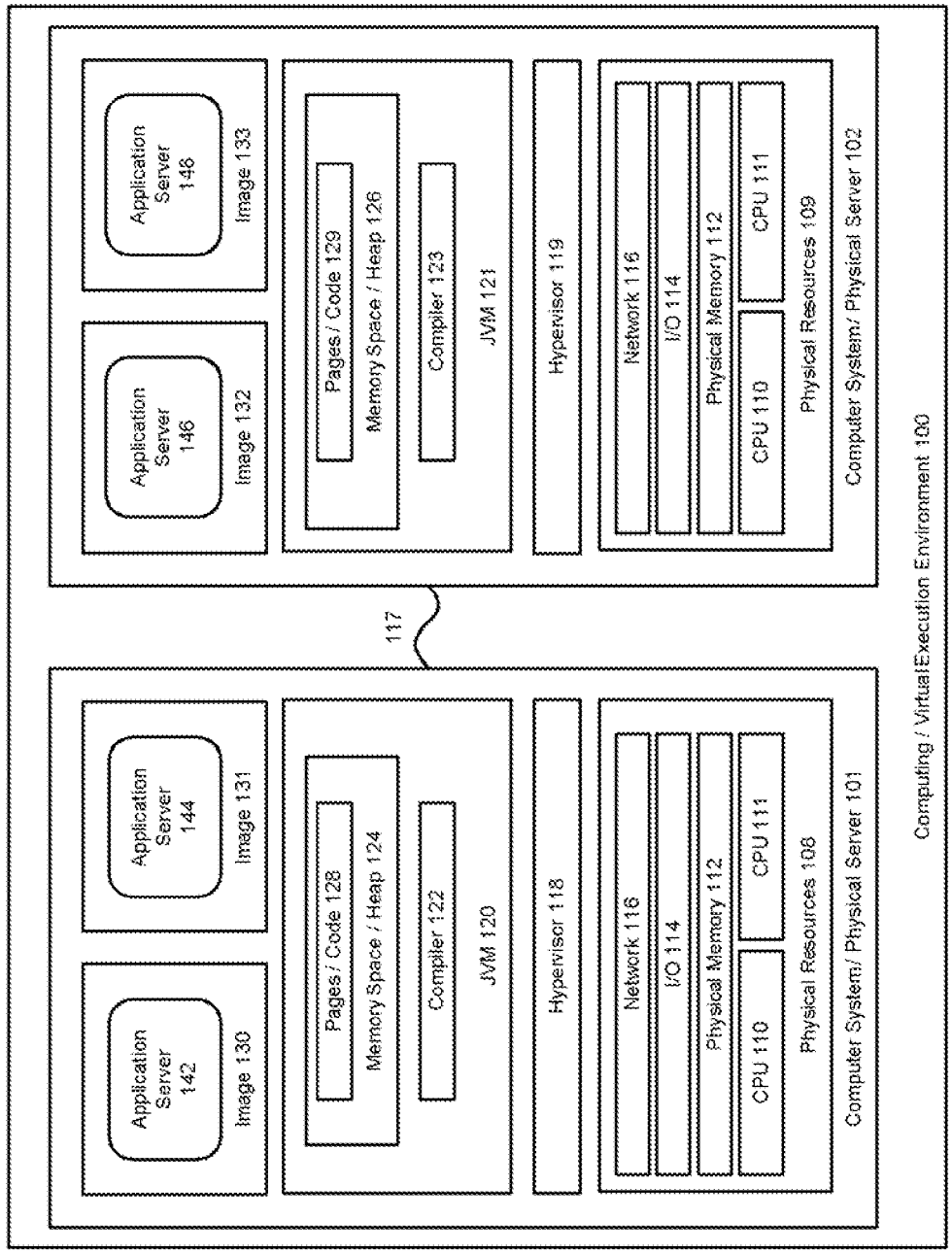
FIG. 1 shows an illustration of a system for locking memory areas in a JVM to facilitate sharing between virtual servers, in accordance with an embodiment.

As described above, in the context of a high performance computer hardware system, such as a multi-processor rack-based server with a Java Virtual Machine (JVM), a hypervisor and/or an application server, there often arises a conflict between the hypervisor memory sharing, and that of the JVM.

For example, a goal of some contemporary computing platforms, such as the Oracle Exalogic platform, is to provide a unit of computing power installed in an easy to deploy package, such as a standard rack system. Such a system might include a plurality of physical servers working in combination with a hypervisor. Virtual servers running, e.g. WebLogic Virtual Edition or another application server, can be dispatched onto the physical servers, and can be booted from identical virtual machine images. Since the virtual machine images are identical, a lot of the shared physical memory in the system can initially be shared between the virtual servers by the hypervisor. This sharing is made possible since the hypervisor takes the opportunity to do copy-on-write on shared memory to reduce physical memory usage.

However, conflicts can arise between the hypervisor memory sharing and the JVM. For example, a virtual machine image snapshot used to boot the virtual servers can be taken immediately after the application server (e.g. WebLogic) has booted. This means that initially a lot of memory can be shared between the different virtual servers, e.g. just-in-time compiled (JIT) and optimized code, and large parts of the Java heap. Unfortunately as soon as the WebLogic server starts executing with a real load, the JVM will JIT new code and potentially re-optimize old code, which in turn will introduce changes within the memory allocated for code, and will require the hypervisor to create a copy of the shared memory.

This forced un-sharing is made significantly worse when the JVM tries to use large-pages to optimize the performance. As referred to herein, the system's physical memory is divided into frames, and the virtual memory is divided into pages. A memory management component generally uses information in a page table to perform translation of virtual memory addresses to physical memory addresses. Since page table lookups are computationally expensive, a fast lookup cache called a Translation Lookaside Buffer(TLB) can be used, which contains the virtual memory address to physical memory address mapping. When a valid address translation is not present in the TLB, this is considered a TLB miss, and the memory management unit will have to refer to the page tables to get the translation. Hence reduction of TLB misses is desirable. Large pages are hardware supported operating system (O/S) pages between 1 MB and 1 GB (instead of 4 KB) that can reduce the number of TLB misses significantly during runtime. If, for example, a 100 MB large page is used for code, then even the tiniest JITted method could prevent the hypervisor from sharing 100 MB of physical memory between virtual servers, since that tiny newly JITted method would introduce a change within this large page.

To address this, disclosed herein is a system and method for locking memory areas in a JVM to facilitate sharing between virtual servers. In accordance with an embodiment, the system comprises a computing/virtual execution environment, which includes one or more physical computers, computer systems, server computers, or similar computing devices, a hypervisor, and a virtual machine or JVM. The JVM allows one or more application images to be run on the computer, wherein the application images can include application server instances. The application server uses a first large page in memory during its startup process, and is configured so that it signals to the JVM when the application server has completed its startup and has potentially pre-optimized important code. When the JVM receives this signal, it internally write-protects or locks the page used for application server code memory, so that any new JITed code or re-optimized code is subsequently written into a new large page. The original page will therefore be undisturbed and will always be shareable between the virtual servers running within the hypervisor.

FIG. 1 shows an illustration of a system for locking memory areas in a JVM to facilitate sharing between virtual servers, in accordance with an embodiment. As shown in FIG. 1, the system comprises a computing/virtual execution environment 100, which includes one or more physical computers, computer systems, server computers, or similar computing devices 101, 102. Each computer system includes physical resources 108, 109, such as one or more processors (CPU's) 110,111, physical storage memory 112, input/output (I/O) 114, and networking resources 116, and can be interconnected with other computer systems via high speed physical networking, the Internet, or a similar communications technology 117. Each computer system includes a hypervisor 118, 119, which can multiplex the physical resources of that computer system between one or more virtual machine images or assemblies operating on the computer system, creating the illusion that each image instance has direct and sole access to the resources, and providing isolation between those images.

As further shown in FIG. 1, in accordance with an embodiment, each computer system includes a virtual machine (VM) or JVM 120, 121, for example an Oracle JRockit, Hotspot or another JVM implementation, that allows compiled Java programs to be run on the JVM independently of the hardware or operating system used underneath. Each JVM includes a compiler 122, 123, and a memory space or heap 124, 126 for storage of compiled bytecode, typically in pages 128, 129 as described above.

As further shown in FIG. 1, in accordance with an embodiment, the JVM allows one or more application images 130, 131, 132, 133 to be run on the computer. Application images can include application server instances 142, 144, 146, 148, (for example instances of WebLogic Server or other types of application server).

Figure 2:
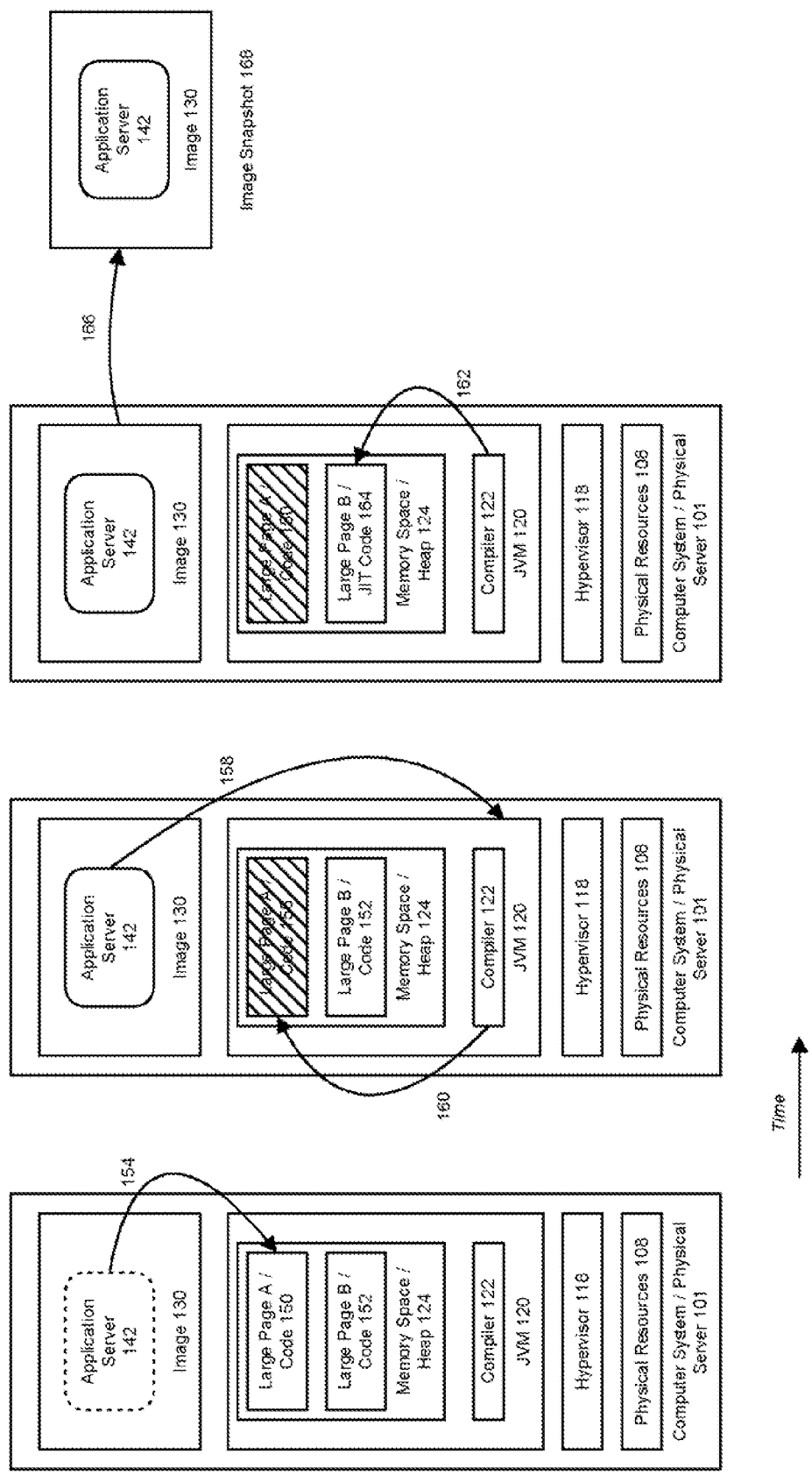
FIG. 2 shows an illustration of how the system can be used for locking memory areas in a JVM to facilitate sharing between virtual servers, in accordance with an embodiment.

FIG. 2 shows an illustration of how the system can be used for locking memory areas in a JVM to facilitate sharing between virtual servers, in accordance with an embodiment. As shown in FIG. 2, which for clarity omits some of the components described above, the application server 142 (e.g. a Weblogic instance) uses a first large page 150 in memory during its startup process 154, which modifies the contents of that page 156, but leaves other pages (including a second large page 152) available to the JVM (e.g. a JRockit JVM) for other uses.

The application server is configured so that it signals 158 to the JVM when the application server has completed its startup and has potentially pre-optimized important code.

When the JVM receives this signal, it internally write-protects or locks 160 the page used for application server code memory.

Any new JITed code or re-optimized code is subsequently written 162 into a new large page 164 (e.g. the second large page). The original page will therefore be undisturbed and will always be shareable between the virtual servers running within the hypervisor.

The virtual machine image snapshot 168 is then taken 166 after the JVM has write-protected the code page.

In accordance with an embodiment, the principles described above can be similarly applied to the Java heap. For example, when the JVM receives this signal it can compact the Java heap as much as possible, and write protect the lower part of the Java heap where the application server is stored. When code/objects die within the write protected areas of the JVM, the memory used for these code/objects cannot be reclaimed. This is satisfactory since most of the application server code will not need to be re-optimized, nor will the actual application server be reloaded. Instead a new virtual machine image will be started on the hypervisor, and the old virtual machine image shut down.

Figure 3:
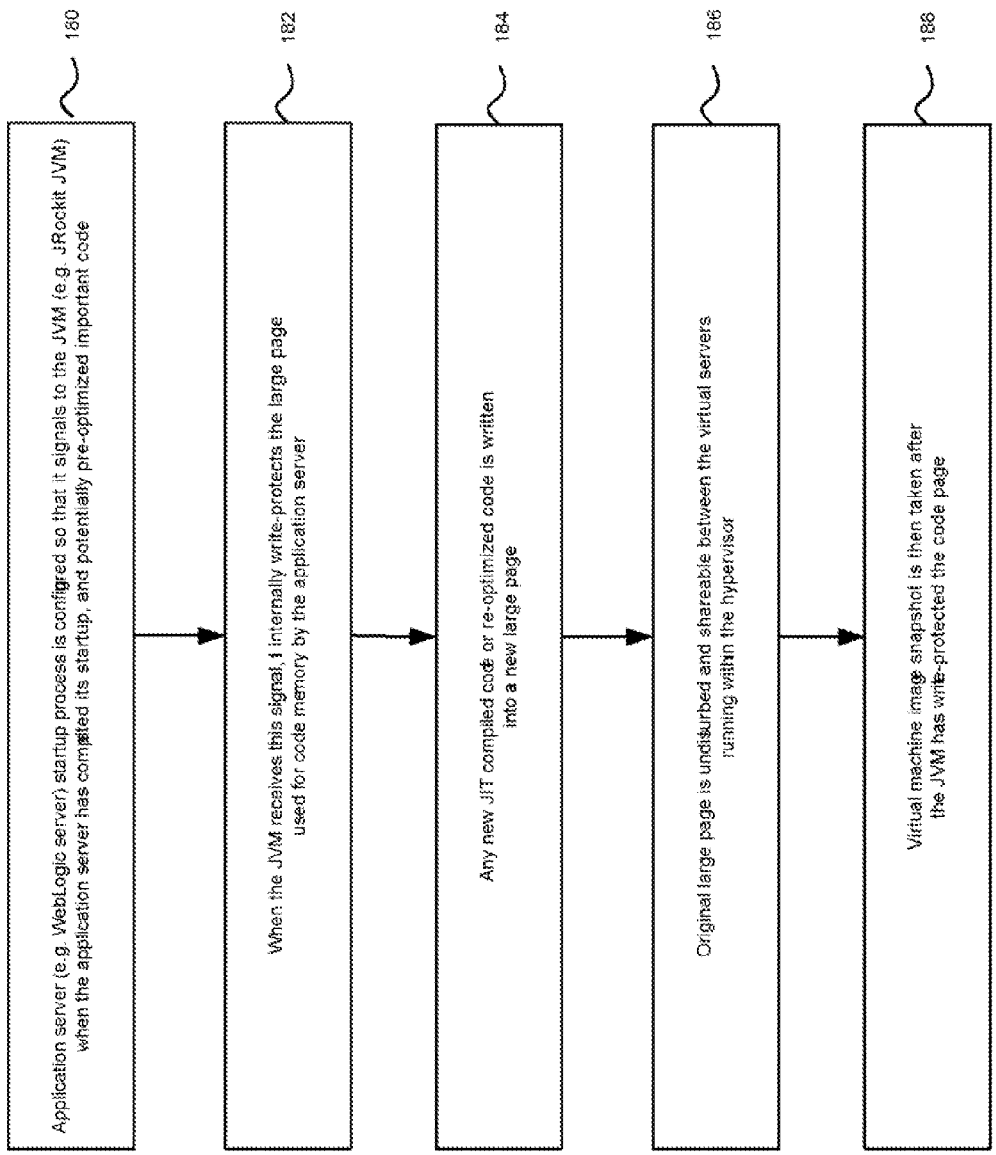
FIG. 3 shows a flowchart of a method for locking memory areas in a JVM to facilitate sharing between virtual servers, in accordance with an embodiment.

FIG. 3 shows a flowchart of a method for locking memory areas in a JVM to facilitate sharing between virtual servers, in accordance with an embodiment. As shown in FIG. 3, in step 180, the application server (e.g. a Weblogic instance) uses a first large page in memory during its startup process, which modifies the contents of that page, but leaves other pages (including a second large page) available to the JVM (e.g. a JRockit JVM) for other uses. The application server is configured so that it signals to the JVM when the application server has completed its startup and has potentially pre-optimized important code.

In step 182, when the JVM receives this signal, it internally write-protects or locks the page used for application server code memory.

In step 184, any new JITed code or re-optimized code is subsequently written 162 into a new large page (e.g. the second large page).

In step 186, the original page will therefore be undisturbed and will always be shareable between the virtual servers running within the hypervisor.

In step 188, the virtual machine image snapshot is then taken after the JVM has write-protected the code page.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for locking memory areas in a Java Virtual Machine (JVM) to facilitate sharing between virtual servers, comprising:
    a computing or virtual execution environment which includes one or more physical computers;
    a hypervisor for use with the computing or virtual execution environment;
    a virtual machine that includes a compiler and a memory space or heap for storage of compiled bytecode, and that allows one or more application images to be run on the computing or virtual execution environment, wherein the one or more application images includes an application server instance; and
    wherein the application server instance uses a first portion of the memory space or heap during its startup process, and is configured so that it signals to the virtual machine when the application server instance has completed its startup process, and
    when the virtual machine receives a signal from the application server instance, it internally write-protects or locks a page used for application server code memory, so that any new compiled or re-optimized code is subsequently written into a new or second portion of the memory space or heap.

2. The system of claim 1, wherein the virtual machine is a Java Virtual Machine (JVM).

3. The system of claim 1, wherein the application server instance uses the first portion of the memory space or heap during its startup process to potentially pre-optimize important code.

4. The system of claim 1, wherein the first portion of the memory space or heap is therefore undisturbed following the application server startup process, and is thereafter shareable with other virtual servers running within the hypervisor.

5. The system of claim 1, wherein the memory space or heap includes large pages, and wherein the application server instance uses a first large page during the startup process, and wherein when the virtual machine receives a signal that the application server has completed its startup process, the virtual machine internally write-protects or locks the first large page used for application server code memory, so that any new compiled or re-optimized code is subsequently written into a new or second large page.

6. The system of claim 1, wherein following the application server startup process, and the virtual machine write-protecting a code page, an image snapshot is taken, which is shareable with other virtual servers running within the hypervisor.

7. A method for locking memory areas in a Java Virtual Machine (JVM) to facilitate sharing between virtual servers, comprising the steps of:
    providing a computing or virtual execution environment which includes one or more physical computers or similar computing devices;
    providing a hypervisor for use with the computing or virtual execution environment;
    providing a virtual machine that includes a compiler and a memory space or heap for storage of compiled bytecode, and that allows one or more application images to be run on the computing or virtual execution environment, wherein the one or more application images includes an application server instance; and
    wherein the application server instance uses a first portion of the memory space or heap during its startup process, and is configured so that it signals to the virtual machine when the application server instance has completed its startup process, and
    when the virtual machine receives a signal from the application server instance, it internally write-protects or locks a page used for application server code memory, so that any new compiled or re-optimized code is subsequently written into a new or second portion of the memory space or heap.

8. The method of claim 7, wherein the virtual machine is a Java Virtual Machine (JVM).

9. The method of claim 7, wherein the application server instance uses the first portion of the memory space or heap during its startup process to potentially pre-optimize important code.

10. The method of claim 7, wherein the first portion of the memory space or heap is therefore undisturbed following the application server startup process, and is thereafter shareable with other virtual servers running within the hypervisor.

11. The method of claim 7, wherein the memory space or heap includes large pages, and wherein the application server instance uses a first large page during the startup process, and wherein when the virtual machine receives a signal that the application server has completed its startup process, the virtual machine internally write-protects or locks the first large page used for application server code memory, so that any new compiled or re-optimized code is subsequently written into a new or second large page.

12. The method of claim 7, wherein following the application server startup process, and the virtual machine write-protecting a code page, an image snapshot is taken, which is shareable with other virtual servers running within the hypervisor.

13. A non-transitory computer readable storage medium, including instructions stored thereon, which when read and executed by a computer, cause the computer to perform the steps comprising:
    providing a hypervisor for use with a computing or virtual execution environment;
    providing a virtual machine that includes a compiler and a memory space or heap for storage of compiled bytecode, and that allows one or more application images to be run on the computing or virtual execution environment, wherein the one or more application images includes an application server instance; and wherein the application server instance uses a first portion of the memory space or heap during its startup process, and is configured so that it signals to the virtual machine when the application server instance has completed its startup process, and when the virtual machine receives a signal from the application server instance, it internally write-protects or locks a page used for application server code memory, so that any new compiled or re-optimized code is subsequently written into a new or second portion of the memory space or heap.

14. The non-transitory computer readable storage medium of claim 13, wherein the virtual machine is a Java Virtual Machine (JVM).

15. The non-transitory computer readable storage medium of claim 13, wherein the application server instance uses the first portion of the memory space or heap during its startup process to potentially pre-optimize important code.

16. The non-transitory computer readable storage medium of claim 13, wherein the first portion of the memory space or heap is therefore undisturbed following the application server startup process, and is thereafter shareable with other virtual servers running within the hypervisor.

17. The non-transitory computer readable storage medium of claim 13, wherein the memory space or heap includes large pages, and wherein the application server uses a first large page during the startup process, and wherein when the virtual machine receives a signal that the application server has completed its startup process, the virtual machine internally write-protects or locks the first large page used for application server code memory, so that any new compiled or re-optimized code is subsequently written into a new or second large page.

18. The non-transitory computer readable storage medium of claim 13, wherein following the application server startup process, and the virtual machine write-protecting a code page, an image snapshot is taken, which is shareable with other virtual servers running within the hypervisor.

* * * * *

UNITED STATES PATENT AND TRADEMARK OFFICE
CERTIFICATE OF CORRECTION

| | |
|---|---|
| PATENT NO. | : 8,533,383 B2 |
| APPLICATION NO. | : 13/007429 |
| DATED | : September 10, 2013 |
| INVENTOR(S) | : Ohrstrom et al. |

It is certified that error appears in the above-identified patent and that said Letters Patent is hereby corrected as shown below:

In the Drawings

On sheet 3 of 3, in figure 3, reference numeral 180, line 1, delete "configred" and insert -- configured --, therefor.

On sheet 3 of 3, in figure 3, reference numeral 182, line 1, delete "i" and insert -- it --, therefor.

Signed and Sealed this
Tenth Day of December, 2013

Margaret A. Focarino
*Commissioner for Patents of the United States Patent and Trademark Office*